United States Patent
Tashiro et al.

(10) Patent No.: US 10,561,970 B2
(45) Date of Patent: Feb. 18, 2020

(54) FILTRATION DEVICE

(71) Applicant: BUNRI Incorporation, Miyakonojo-shi, Miyazaki (JP)

(72) Inventors: Minoru Tashiro, Tokyo (JP); Makoto Tashiro, Tokyo (JP)

(73) Assignee: BUNRI INCORPORATION, Miyakonojo-shi (JP)

(*) Notice: Subject to any disclaimer, the term of this patent is extended or adjusted under 35 U.S.C. 154(b) by 0 days.

(21) Appl. No.: 16/001,464

(22) Filed: Jun. 6, 2018

(65) Prior Publication Data

US 2018/0280841 A1 Oct. 4, 2018

Related U.S. Application Data

(63) Continuation of application No. PCT/JP2016/080819, filed on Oct. 18, 2016.

(30) Foreign Application Priority Data

Dec. 25, 2015 (JP) .................... 2015-254072

(51) Int. Cl.
*B01D 33/06* (2006.01)
*B01D 33/58* (2006.01)
(Continued)

(52) U.S. Cl.
CPC ............ *B01D 33/06* (2013.01); *B01D 33/41* (2013.01); *B01D 33/58* (2013.01); *B01D 33/80* (2013.01); *B23Q 11/126* (2013.01)

(58) Field of Classification Search
CPC ........ B01D 33/06; B01D 33/41; B01D 33/58; B01D 33/80; B23Q 11/00; B23Q 11/10; B23Q 11/126; Y02P 70/171
See application file for complete search history.

(56) References Cited

U.S. PATENT DOCUMENTS 5,603,846 A   2/1997   Uchiyama et al.
5,992,642 A * 11/1999   Ota .................... B01D 33/04
                                              210/396

(Continued)

FOREIGN PATENT DOCUMENTS

CN   1273158 A   11/2000
CN   1578716 A   2/2005

(Continued)

OTHER PUBLICATIONS

English translation of International Search Report dated Nov. 15, 2016 in connection with PCT International Application No. PCT/JP2016/080819.

(Continued)

*Primary Examiner* — Dirk R Bass
(74) *Attorney, Agent, or Firm* — John P. White

(57) ABSTRACT

A filtration device has a primary conveyer tank which is equipped with a first conveyer, a primary drum filter which rotates inside the primary conveyer tank, a secondary conveyer tank which is equipped with a second conveyer and a secondary drum filter which rotates inside the secondary conveyer tank. Liquid in the primary conveyer tank passes through a first opening to flow into the secondary conveyer tank. Clean liquid flowing into a first clean tank is supplied to a low-pressure-side supply system by a first pump. Super-clean liquid having been filtered by the secondary drum filter passes through a second opening to flow into a second clean tank, and then is supplied to a high-pressure-side supply system by a second pump.

5 Claims, 5 Drawing Sheets

(51) Int. Cl.
    *B01D 33/80*     (2006.01)
    *B01D 33/41*     (2006.01)
    *B23Q 11/12*     (2006.01)

(56) References Cited

U.S. PATENT DOCUMENTS

| 2008/0035554 | A1 | 2/2008 | Tashiro |
| 2013/0193056 | A1 | 8/2013 | Tashiro |

FOREIGN PATENT DOCUMENTS

| CN | 103189121 A | 7/2013 |
| EP | 0 953 371 A2 | 11/1999 |
| JP | 8-66607 A | 3/1996 |
| JP | 2904334 B2 | 6/1999 |
| JP | 11-239704 A | 9/1999 |
| JP | 2003-011031 A | 1/2003 |
| JP | 3389126 B2 | 3/2003 |
| JP | 2012-96139 A | 5/2012 |
| JP | 2014-205218 A | 10/2014 |
| JP | 2016-102519 A | 6/2016 |
| KR | 10-0228260 B1 | 11/1999 |
| WO | WO 2007/105438 A1 | 9/2007 |

OTHER PUBLICATIONS

Chinese official action (and English translation thereof) dated Jul. 2, 2019 in connection with Chinese patent Application No. 201680075606.9.

European Extended European Search Report dated Jul. 16, 2019 in connection with European patent Application No. 16878117.7.

Nov. 25, 2019 official action in connection with Korean patent application No. KR10-2018-7017780.

\* cited by examiner

FILTRATION DEVICE

CROSS-REFERENCE TO RELATED APPLICATIONS

This application is a Continuation Application of PCT Application No. PCT/JP2016/080819, filed Oct. 18, 2016 and based upon and claiming the benefit of priority from prior Japanese Patent Application No. 2015-254072, filed Dec. 25, 2015, the entire contents of all of which are incorporated herein by reference.

BACKGROUND OF THE INVENTION

1. Field of the Invention

The present invention described herein relate generally to a filtration device for purifying a liquid containing shavings, fine particles, etc., such as a coolant used for, for example, a machine tool.

2. Description of the Related Art

In machine tools which perform mechanical processing such as cutting or grinding, a coolant is supplied to a workpiece or a tool. Shavings, fine particles and the like are mixed in the used coolant. To purify and reuse such a coolant, various filtration devices have been conventionally suggested. For example, each of the filtration devices disclosed in the Patent Literature 1 (JP 2904334 B) or Patent Literature 2 (JP 3389126 B) comprises a filter tank, a conveyer for carrying out sludge, a mesh drum which functions as a filter, etc. The coolant purified by each filtration device is supplied to a machine tool, and is used to cool a workpiece or tool or wash the inside of the machine tool.

To jet a coolant through a narrow channel formed in a tool, etc., the coolant needs to be supplied to the channel by a high-pressure pump. However, the narrow channel is easily clogged with foreign substances such as particles. When a filter is provided in the pump to prevent clogging, the structure of the pump becomes complicated, and the filter needs to be regularly changed. The used filter has to be processed as industrial waste. Thus, the cost is high. In conventional filtration devices, the unclean coolant discharged from a machine tool is supplied to and stored in a filter tank. Thus, it is impossible to avoid the storage of sludge in the filter tank. The inside of the tank needs to be frequently cleaned. The conventional filtration devices require great care.

BRIEF SUMMARY OF THE INVENTION

The object of the present invention is to provide a filtration device which has high filtration accuracy, does not require the cleaning of a tank and is capable of supplying a clean liquid obtained by primary filtration and a super clean liquid obtained by secondary filtration to a low-pressure-side supply system or high-pressure-side supply system of a machine tool, etc., depending on the need.

According to one embodiment, a filtration device comprises a primary conveyer tank, a primary drum filter, a secondary conveyer tank, a secondary drum filter, a driver, a first clean tank, a first pump, a second clean tank and a second pump.

The primary conveyer tank comprises a first conveyer. A liquid to be filtered is supplied to the primary conveyer tank. The primary drum filter is provided in a liquid of the primary conveyer tank, and is rotated by a chain of the first conveyer. The primary drum filter comprises a primary flow hole for filtering the liquid in the primary conveyer tank.

The secondary conveyer tank is adjacent to the primary conveyer tank. The secondary conveyer tank comprises a second conveyer. The secondary conveyer tank communicates with inside of the primary drum filter via a first opening formed between the secondary conveyer tank and the primary conveyer tank. A clean liquid obtained by first filtration by the primary drum filter flows into the secondary conveyer tank. The secondary drum filter is provided in the clean liquid in the secondary conveyer tank, and is rotated by a chain of the second conveyer. The secondary drum filter comprises a secondary flow hole for further filtering the clean liquid in the secondary conveyer tank. The driver drives the first conveyer and the second conveyer.

The first clean tank communicates with the secondary conveyer tank. The clean liquid in the secondary conveyer tank flows into the first clean tank. The first pump supplies the clean liquid in the first clean tank to a first liquid use portion. The second clean tank is adjacent to the secondary conveyer tank. The second clean tank communicates with inside of the secondary drum filter via a second opening formed between the second clean tank and the secondary conveyer tank. A super clean liquid obtained by secondary filtration by the secondary drum filter flows into the second clean tank. The second pump supplies the super clean liquid in the second clean tank to a second liquid use portion.

According to the filtration device of the embodiment, the clean liquid obtained by the primary filtration by the primary drum filter can be supplied to the low-pressure-side supply system of a machine tool, etc. The super clean liquid obtained by the filtration with higher accuracy by the secondary drum filter can be supplied to the high-pressure-side supply system. The filtering accuracy is high, and there is no need to frequently clean the tank. Thus, the maintenance is easy.

An example of the first pump is a low-pressure pump for supplying the clean liquid to the liquid use portion on the low-pressure side. An example of the liquid use portion on the low-pressure side is the shower coolant jet portion of a machine tool. An example of the second pump is a high-pressure pump for supplying the super clean liquid to the liquid use portion on the high-pressure side at a pressure higher than the pressure of the first pump. An example of the liquid use portion on the high-pressure side is the through-spindle coolant jet portion of a machine tool.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

With reference to FIG. 1 to FIG. 5, this specification hereinafter explains a filtration device according to one embodiment of the present invention.

Figure 1:
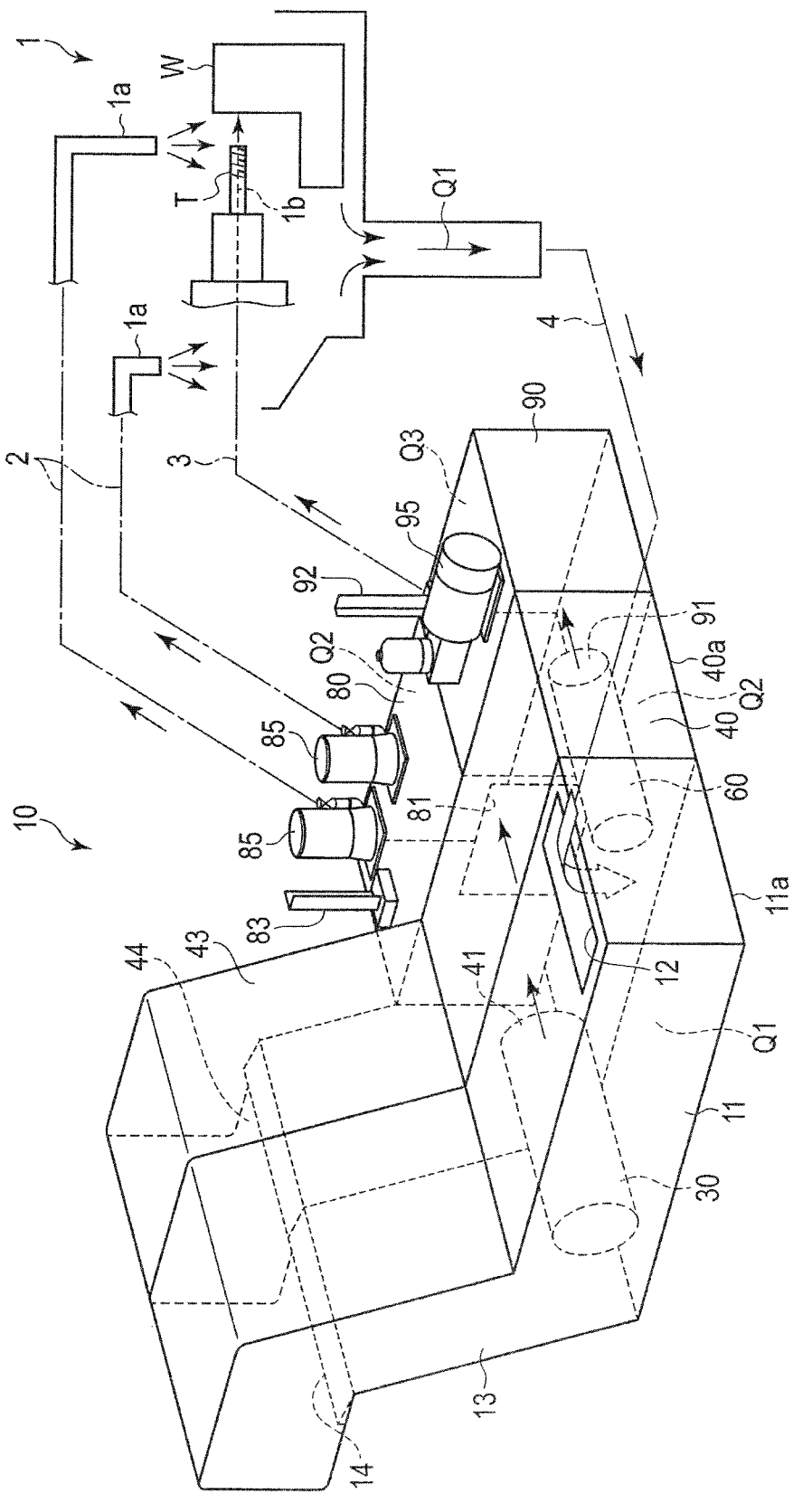
FIG. 1 is a perspective view schematically showing a filtration device according to one embodiment.

FIG. 1 schematically shows a machine tool 1 which performs machine work such as cutting or grinding, and a filtration device 10. An example of the machine tool 1 includes a low-pressure-side supply system 2 and a high-pressure-side supply system 3. The low-pressure-side supply system 2 supplies a liquid with a relatively low pressure (for example, less than 1 MPa) to a first liquid use portion 1a. The high-pressure-side supply system 3 supplies a liquid with a relatively high pressure (for example, 1.5 to 3 MPa) to a second liquid use portion 1b. The low-pressure-side supply system 2 jets a liquid (for example, a shower coolant) to a workpiece W or its vicinity.

On the other hand, the high-pressure-side supply system 3 supplies a liquid (for example, a through-spindle coolant) with high pressure to a narrow channel formed in a tool T. Since the liquid with high pressure flows in the channel having a small cross-sectional area, the high-pressure-side supply system 3 needs to supply a liquid filtered with high accuracy. Liquid Q1 discharged from the first liquid use portion 1a and the second liquid use portion 1b contains substances to be eliminated such as shavings and fine particles. To filter liquid Q1, liquid Q1 is supplied to the filtration device 10 via a return channel 4.

The filtration device 10 is explained below.

Figure 2:
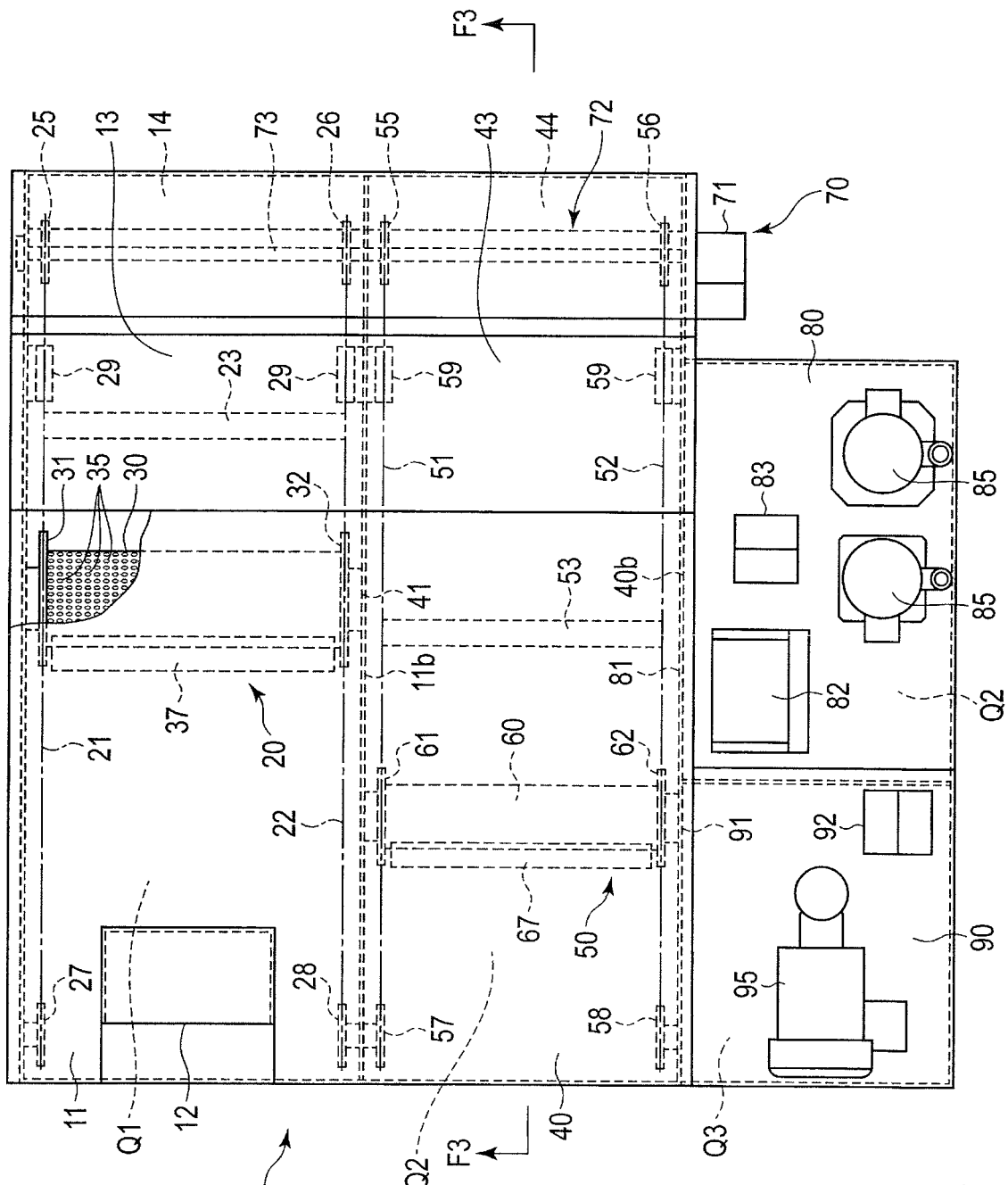
FIG. 2 is a plan view of the filtration device shown in FIG. 1.
Figure 3:
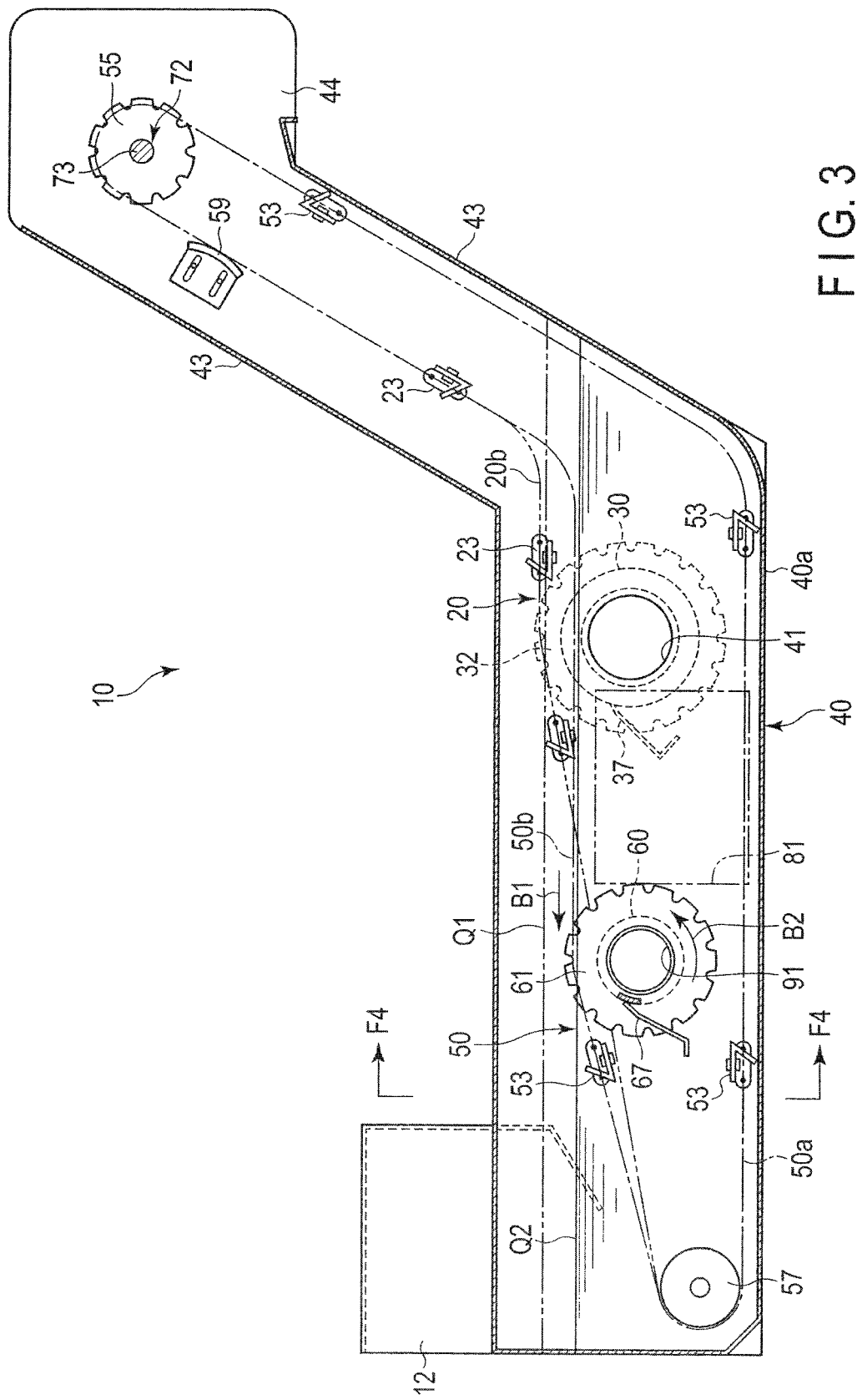
FIG. 3 is a cross-sectional view of the filtration device along the line F3-F3 of FIG. 2.
Figure 4:
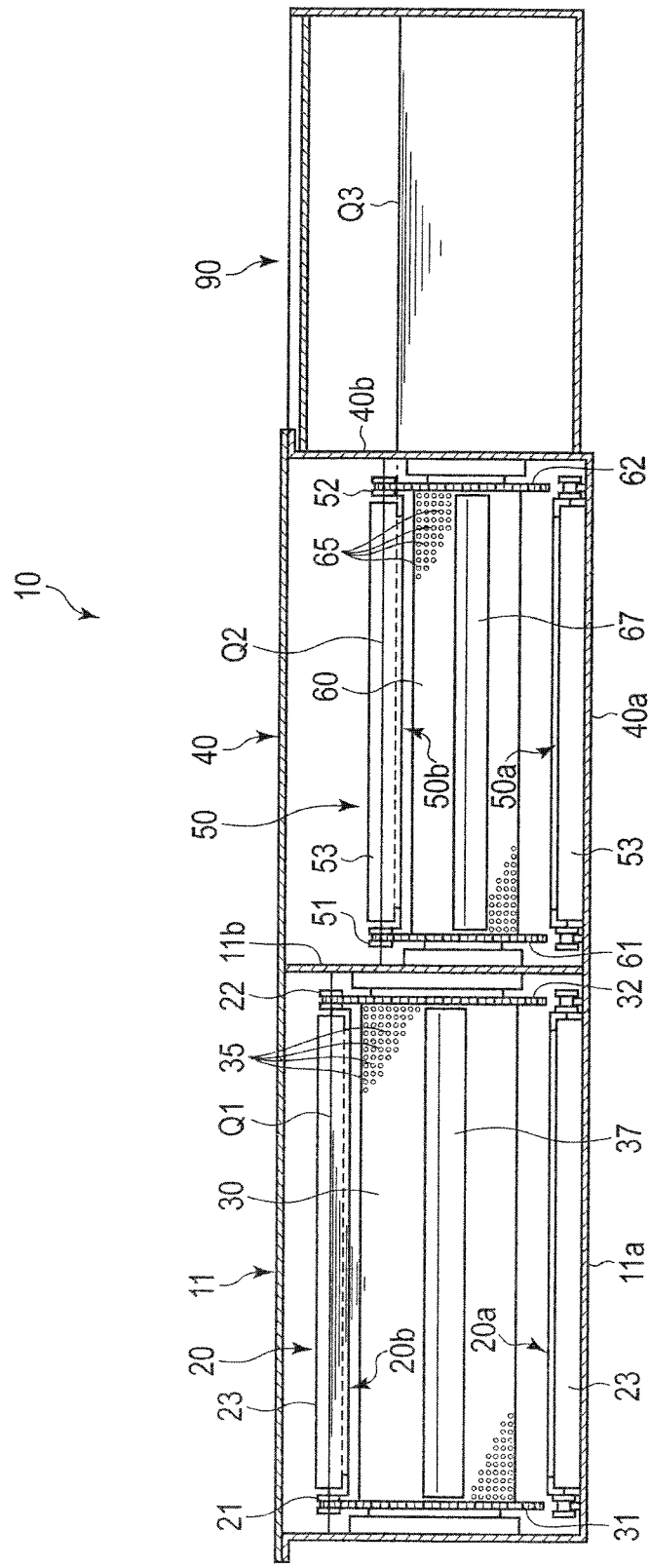
FIG. 4 is a cross-sectional view of the filtration device along the line F4-F4 of FIG. 3.
Figure 5:
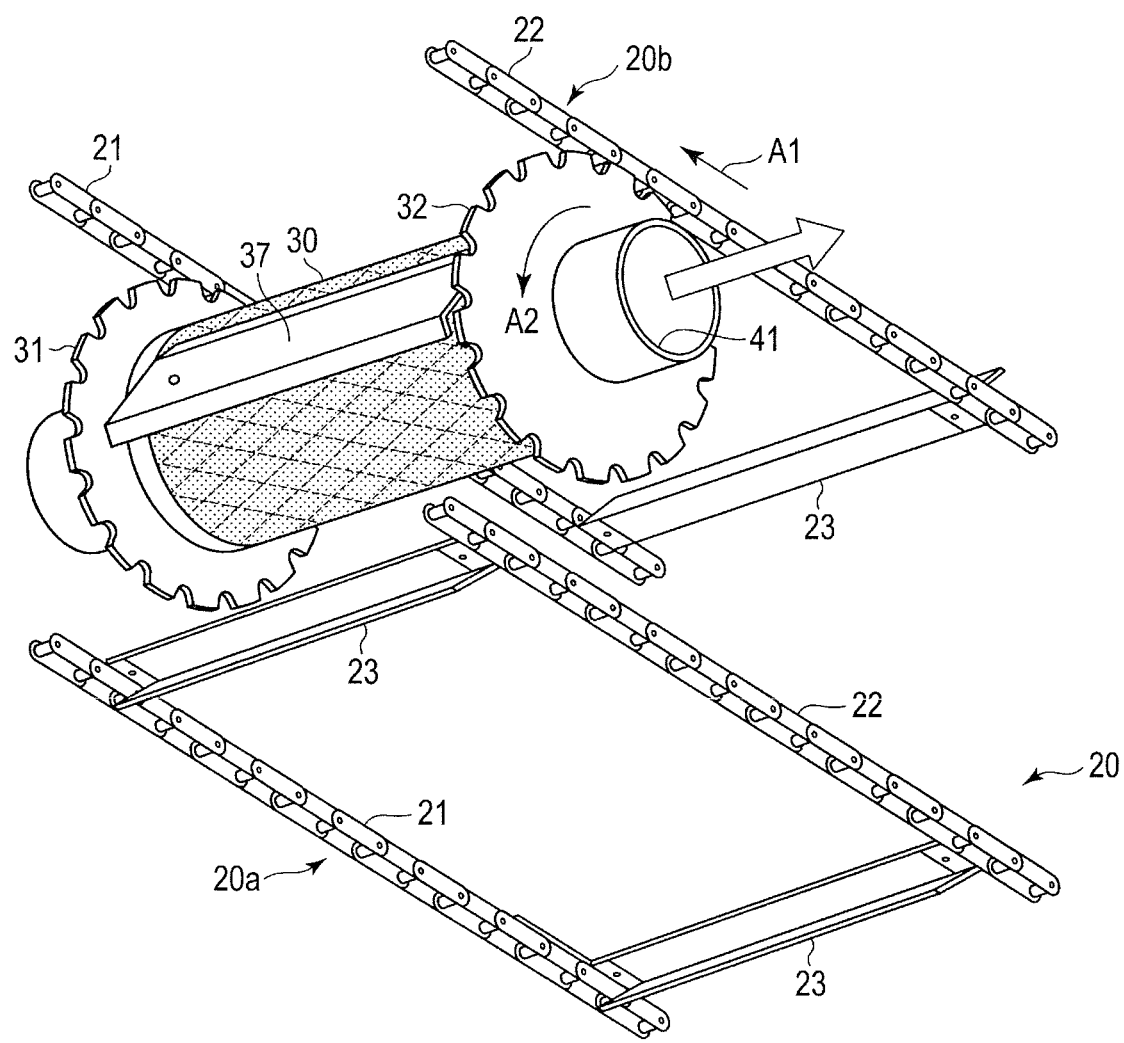
FIG. 5 is a perspective view showing a part of the filtration device.

FIG. 1 shows the outline of the filtration device 10. FIG. 2 is a plan view of the filtration device 10. FIG. 3 is a cross-sectional view along the line F3-F3 of FIG. 2. FIG. 4 is a cross-sectional view along the line F4-F4 of FIG. 3. FIG. 5 is a perspective view showing a part of the filtration device 10.

The filtration device 10 includes a primary conveyer tank 11, a primary drum filter 30, a secondary conveyer tank 40, a secondary drum filter 60, a driver 70, a first clean tank 80, a first pump 85, a second clean tank 90, a second pump 95, etc.

The primary conveyer tank 11 comprises a liquid inlet 12 and a sludge scraping portion 13. Liquid Q1 which should be filtered and is supplied from the machine tool 1 is supplied to the primary conveyer tank 11 via the liquid inlet 12. The sludge scraping portion 13 extend obliquely upward from an end portion of the primary conveyer tank 11. A sludge discharge portion 14 is formed on the top.

A first conveyer 20 is provided in the primary conveyer tank 11. The first conveyer 20 is provided in a range from a bottom portion 11a of the primary conveyer tank 11 to the sludge discharge portion 14 via the sludge scraping portion 13. The first conveyer 20 comprises a pair of chains 21 and 22, and a plurality of scrapers 23 attached to the chains 21 and 22. The chains 21 and 22 are wound around a pair of first drive sprockets 25 and 26, and guide members 27 and 28. Chain tensioners 29 for adjusting the tension of the chains 21 and 22 are provided in the sludge scraping portion 13.

A lower portion 20a of the first conveyer 20 moves to the sludge discharge portion 14 along the bottom portion 11a of the primary conveyer tank 11 and the bottom surface of the sludge scraping portion 13. The sludge on the bottom portion 11a of the primary conveyer tank 11, such as shavings, is conveyed to the sludge discharge portion 14 by the scrapers 23 of the first conveyer 20. A collection box is provided under the sludge discharge portion 14. The sludge conveyed to the sludge discharge portion 14 falls to the collection box.

The primary drum filter 30 is provided in the primary conveyer tank 11. The primary drum filter 30 is completely immersed in liquid Q1. Sprockets 31 and 32 are provided at the both ends of the primary drum filter 30. The sprockets 31 and 32 are engaged with the chains 21 and 22 of an upper portion 20b of the first conveyer 20. Thus, when the first conveyer 20 moves in the direction of arrow A1 of FIG. 5, the primary drum filter 30 rotates in the direction of arrow A2. The number of primary drum filters 30 is not limited to one. A plurality of primary drum filters 30 may be provided based on the capacity of filtration.

For example, the primary drum filter 30 may be obtained by shaping a stainless steel punching metal having a thickness of 0.5 mm into a cylindrical form. The primary drum filter 30 comprises a large number of primary flow holes 35 (only partially shown in FIG. 2 and FIG. 4). The diameter of the primary drum filter 30 is, for example, $\varphi 150$ mm. The hole diameter of each primary flow hole 35 is, for example, $\varphi 0.5$ mm or $\varphi 0.7$ mm. Liquid Q1 in the primary conveyer tank 11 flows through the primary flow holes 35 from the outer circumferential side to the inner circumferential side of the primary drum filter 30. In this way, liquid Q1 is primarily filtered. A scraping plate 37 is in contact with the circumferential surface of the primary drum filter 30.

The secondary conveyer tank 40 is adjacent to the primary conveyer tank 11. A first opening 41 is formed in a partition wall 11b formed between the primary conveyer tank 11 and the secondary conveyer tank 40. The secondary conveyer tank 40 communicates with the inside of the primary drum filter 30 via the first opening 41. Thus, clean liquid Q2 obtained by the filtration by the primary drum filter 30 flows into the secondary conveyer tank 40.

The height of a bottom portion 40a of the secondary conveyer tank 40 is substantially the same as that of the bottom portion 11a of the primary conveyer tank 11. A sludge scraping portion 43 is formed in the secondary conveyer tank 40. The sludge scraping portion 43 extend obliquely upward from an end portion of the secondary conveyer tank 40 in a manner similar to that of the sludge scraping portion 13 of the primary conveyer tank 11. A sludge discharge portion 44 is formed on the top of the sludge scraping portion 43.

A second conveyer 50 is provided in the secondary conveyer tank 40. The second conveyer 50 is provided in a range from the bottom portion 40a of the secondary conveyer tank 40 to the sludge discharge portion 44 via the sludge scraping portion 43. The second conveyer 50 comprises a pair of chains 51 and 52, and a plurality of scrapers 53. The scrapers 53 are attached to the chains 51 and 52. The chains 51 and 52 are wound around a pair of second drive sprockets 55 and 56, and guide members 57 and 58. Chain tensioners 59 for adjusting the tension of the chains 51 and 52 are provided in the sludge scraping portion 43.

A lower portion 50a of the second conveyer 50 moves to the sludge discharge portion 44 along the bottom portion 40a of the secondary conveyer tank 40 and the bottom surface of the sludge scraping portion 43. A collection box is provided under the sludge discharge portion 44. The sludge on the bottom portion 40a of the secondary conveyer tank 40, such as shavings, is conveyed to the sludge discharge portion 44 by the scrapers 53 of the second conveyer 50. The sludge conveyed to the sludge discharge portion 44 falls to the collection box.

The secondary drum filter 60 is provided in the secondary conveyer tank 40. The secondary drum filter 60 is completely immersed in clean liquid Q2. Sprockets 61 and 62 are provided at the both ends of the secondary drum filter 60. The sprockets 61 and 62 are engaged with the chains 51 and 52 of an upper portion 50b of the second conveyer 50. Thus, when the second conveyer 50 moves in the direction of arrow B1 of FIG. 3, the secondary drum filter 60 rotates in the direction of arrow B2. The upper surface of the secondary drum filter 60 is lower than the upper surface of the primary drum filter 30. The number of secondary drum filters 60 is not limited to one. A plurality of secondary drum filters 60 may be provided based on the capacity of filtration.

For example, the secondary drum filter 60 may be obtained by shaping a stainless steel thin plate having a thickness of 0.2 mm into a cylindrical form. The secondary drum filter 60 comprises a large number of secondary flow holes 65 (only partially shown in FIG. 4) formed by photo-etching. The diameter of the secondary drum filter 60 is less than that of the primary drum filter 30. The diameter of the secondary drum filter 60 is, for example, φ100 mm.

The hole diameter of each secondary flow hole 65 is less than that of each primary flow hole 35. For example, the hole diameter of each secondary flow hole 65 is φ0.2 mm. The total opening area of the secondary flow holes 65 is less than that of the primary flow holes 35. Clean liquid Q2 in the secondary conveyer tank 40 is filtered by flowing through the secondary flow holes 65 from the outer circumferential side to the inner circumferential side of the secondary drum filter 60. A scraping plate 67 is in contact with the circumferential surface of the secondary drum filter 60.

The driver 70 comprises a single motor 71 (shown in FIG. 2), and a drive shaft 72 rotated by the motor 71. The drive shaft 72 comprises a single shaft body 73, a pair of first drive sprockets 25 and 26 which drive the first conveyer 20, and a pair of second drive sprockets 55 and 56 which drive the second conveyer 50. The drive sprockets 25, 26, 55 and 56 are fixed to the shaft body 73. In the present embodiment, the torque of the motor 71 is input from an end of the drive shaft 72. As all the drive sprockets 25, 26, 55 and 56 are simultaneously rotated by the torque, the structure of the driver 70 is simplified.

The first clean tank 80 communicates with the secondary conveyer tank 40 via a communication opening 81. The communication opening 81 is formed in a partition wall 40b between the first clean tank 80 and the secondary conveyer tank 40. Clean liquid Q2 in the secondary conveyer tank 40 flows into the first clean tank 80 via the communication opening 81. An oil eliminating device (oil skimmer) 82 which eliminates the oil film floating on the liquid level, a liquid level gauge 83 which detects the position of the liquid level of clean liquid Q2, and the first pump (low-pressure pump) 85 are provided in the first clean tank 80. The first pump 85 has a function for supplying clean liquid Q2 in the first clean tank 80 to the low-pressure-side supply system 2 (shown in FIG. 1).

The second clean tank 90 is adjacent to the secondary conveyer tank 40. The capacity of the second clean tank 90 is less than that of the first clean tank 80. The second clean tank 90 communicates with the inside of the secondary drum filter 60 via a second opening 91. The second opening 91 is formed in the partition wall 40b between the second clean tank 90 and the secondary conveyer tank 40. Clean liquid Q2 in the secondary conveyer tank 40 is secondary filtered by the secondary drum filter 60 to be super clean liquid Q3. Super clean liquid Q3 obtained by the secondary filtration by the secondary drum filter 60 flows into the second clean tank 90 via the second opening 91. A liquid level gauge 92 which detects the position of the liquid level of super clean liquid Q3 is provided in the second clean tank 90.

The second pump (high-pressure pump) 95 is provided in the second clean tank 90. The second pump 95 supplies super clean liquid Q3 in the second clean tank 90 to the high-pressure-side supply system 3 (shown in FIG. 1) at a pressure higher than that of the first pump 85. The discharge capacity of the second pump 95 is less than that of the first pump 85.

Now, this specification explains the effects of the filtration device 10 of the present embodiment.

Liquid Q1 discharged from the machine tool 1 is supplied to the primary conveyer tank 11 via the return channel 4 and the liquid inlet 12. The sludge containing shavings, etc., on the bottom portion 11a of the primary conveyer tank 11 is conveyed to the sludge discharge portion 14 by the scrapers 23 of the first conveyer 20. Liquid Q1 in the primary conveyer tank 11 is primarily filtered by the primary drum filter 30, and flows into the secondary conveyer tank 40 via the first opening 41. The sludge attached to the primary drum filter 30 is scraped off by the scraping plate 37.

Liquid Q1 in the primary conveyer tank 11 is filtered by passing through the primary drum filter 30 from the external side to the internal side, and flows into the secondary conveyer tank 40 as clean liquid Q2. Channel resistance is generated when liquid Q1 passes through the primary flow holes 35 of the primary drum filter 30. Thus, the liquid level of clean liquid Q2 having flowed into the secondary conveyer tank 40 is lower than that of liquid Q1 in the primary conveyer tank 11. The diameter of the secondary drum filter 60 is less than that of the primary drum filter 30. Further, the upper surface of the secondary drum filter 60 is lower than the upper surface of the primary drum filter 30. In this way, the exposure of the upper surface of the secondary drum filter 60 from clean liquid Q2 is avoided.

Clean liquid Q2 having flowed into the secondary conveyer tank 40 mostly flows into the first clean tank 80 via the communication opening 81. Clean liquid Q2 having flowed into the first clean tank 80 is sent to the low-pressure-side supply system 2 by the first pump 85. The amount supplied by the first pump 85 is, for example, 200 L/min. The sludge on the bottom portion 40a of the secondary conveyer tank 40 is conveyed to the sludge discharge portion 44 by the scrapers 53 of the second conveyer 50. The sludge attached to the secondary drum filter 60 is scraped off by the scraping plate 67.

In the secondary conveyer tank 40, the scrapers 53 of the upper portion 50b of the second conveyer 50 move to the side under the liquid level of clean liquid Q2 as the scrapers 53 pass the vicinity of the liquid level. The sludge floating around the liquid level of clean liquid Q2 can be guided to the side under the liquid level by the scrapers 53. In this way, it is possible to prevent sludge from continuing to float around the liquid level. Thus, clean liquid Q2 can be effectively further (secondarily) filtered.

Clean liquid Q2 in the secondary conveyer tank 40 is partially secondarily filtered by the secondary drum filter 60, and flows into the second clean tank 90 via the second opening 91. Liquid (super clean liquid) Q3 having flowed into the second clean tank 90 is sent to the high-pressureside supply system 3 by the second pump 95. The amount supplied by the second pump 95 is, for example, 20 L/min.

The first pump 85 pumps up a large amount of clean liquid Q2 having flowed into the first clean tank 80 from the secondary conveyer tank 40, and supplies it to the low-pressure-side supply system 2. The pressure of the first pump 85 is low. However, the discharge of the first pump 85 is great. The second pump 95 supplies a relatively small amount of super clean liquid Q3 having flowed into the second clean tank 90 via the secondary drum filter 60 to the high-pressure-side supply system 3. The pressure of the second pump 95 is high. However, the discharge of the second pump 95 is less. In the present embodiment, the second clean tank 90 for the second pump 95 in which the discharge is less has a small capacity suitable for the discharge of the second pump 95. This structure can contribute to the reduction in the size of the filtration device 10. Thus, the floor area of a plant can be effectively used.

As described above, the filtration device 10 of the present embodiment is capable of supplying clean liquid Q2 obtained by the primary filtration by the primary drum filter 30 to the low-pressure-side supply system 2 of a machine tool, etc., by the first pump 85. Super clean liquid Q3 obtained by the further secondary filtration by the secondary drum filter 60 can be supplied to the high-pressure-side supply system 3 by the second pump 95. A large amount of clean liquid Q2 obtained by the primary filtration can be supplied to the liquid use portion of the low-pressure system in which the use amount is great. Relatively a small amount of super clean liquid Q3 obtained by the secondary filtration with a high filtration accuracy can be supplied to, at high pressure, the liquid use portion of the high-pressure system with a small channel cross-sectional area and a small use amount. In addition, the primary conveyer tank 11 is purified on a steady basis by the first conveyer 20 and the primary drum filter 30. At the same time, the secondary conveyer tank 40 is purified on a steady basis by the second conveyer 50 and the secondary drum filter 60. Thus, there is no need to frequently clean the tanks by human resources. The necessity to provide a filter in the low-pressure-side supply system 2 or the high-pressure-side supply system 3 is reduced. Thus, the maintenance is easy.

To implement the present invention, as a matter of course, the primary conveyer tank, the secondary conveyer tank, the primary drum filter, the secondary drum filter, the first clean tank, the second clean tank, the first pump, the second pump and the like included in the filtration device may be changed in various ways.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A filtration device comprising:
    a primary conveyer tank comprising a first conveyer and supplied with a liquid to be filtered;
    a primary drum filter provided in the liquid of the primary conveyer tank, rotated by a chain of the first conveyer, and comprising a primary flow hole for filtering the liquid in the primary conveyer tank;
    a secondary conveyer tank adjacent to the primary conveyer tank, comprising a second conveyer, and communicating with inside of the primary drum filter via a first opening formed between the secondary conveyer tank and the primary conveyer tank, wherein a clean liquid obtained by filtration by the primary drum filter flows into the secondary conveyer tank;
    a secondary drum filter provided in the clean liquid of the secondary conveyer tank, rotated by a chain of the second conveyer, and comprising a secondary flow hole for further filtering the clean liquid in the secondary conveyer tank;
    a driver which drives the first conveyer and the second conveyer;
    a first clean tank communicating with the secondary conveyer tank, wherein the clean liquid in the secondary conveyer tank flows into the first clean tank;
    a first pump which supplies the clean liquid in the first clean tank to a first liquid use portion;
    a second clean tank adjacent to the secondary conveyer tank, and communicating with inside of the secondary drum filter via a second opening formed between the second clean tank and the secondary conveyer tank, wherein a super clean liquid obtained by filtration by the secondary drum filter flows into the second clean tank; and
    a second pump which supplies the super clean liquid in the second clean tank to a second liquid use portion.

2. The filtration device of claim 1, wherein
the first pump is a low-pressure pump which supplies the clean liquid to a low-pressure-side supply system, and the second pump is a high-pressure pump which supplies the super clean liquid to a high-pressure supply system at a pressure higher than a pressure of the first pump.

3. The filtration device of claim 1, wherein
the driver comprises:
    a drive shaft comprising a shaft body, a pair of first drive sprockets provided in the shaft body and driving the first conveyer, and a pair of second drive sprockets provided in the shaft body and driving the second conveyer; and
    a motor provided at an end of the drive shaft, and simultaneously rotating the first drive sprockets and the second drive sprockets by inputting torque from the end of the drive shaft.

4. The filtration device of claim 1, wherein
a diameter of the secondary drum filter is less than a diameter of the primary drum filter,
a hole diameter of the secondary flow hole is less than a hole diameter of the primary flow hole, and
a total opening area of the secondary flow hole is less than a total opening area of the primary flow hole.

5. The filtration device of claim 4, wherein
the secondary drum filter is provided in the secondary conveyer tank such that an upper surface of the secondary drum filter is lower than an upper surface of the primary drum filter.

* * * * *